United States Patent
Labonte et al.

(10) Patent No.: US 9,729,460 B2
(45) Date of Patent: Aug. 8, 2017

(54) METHOD AND SYSTEM FOR MANAGING PORT BANDWIDTH IN NETWORK DEVICES

(71) Applicant: Arista Networks, Inc., Santa Clara, CA (US)

(72) Inventors: François Labonte, Santa Clara, CA (US); Muhammad Yousuf, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 186 days.

(21) Appl. No.: 14/685,101

(22) Filed: Apr. 13, 2015

(65) Prior Publication Data

US 2016/0301618 A1     Oct. 13, 2016

(51) Int. Cl.
*H04L 1/00* (2006.01)
*H04L 12/873* (2013.01)
*H04L 12/935* (2013.01)

(52) U.S. Cl.
CPC ........ *H04L 47/522* (2013.01); *H04L 49/3045* (2013.01); *H04L 47/527* (2013.01)

(58) Field of Classification Search
CPC ......... H04L 47/70; H04L 47/72; H04L 47/74; H04L 47/78; H04L 47/80; H04L 47/52; H04L 49/3027; H04L 49/90; H04L 2012/5651; H04L 2012/5679; H04L 47/24; H04L 47/2433; H04L 47/50; H04L 47/625; H04L 47/805; H04L 41/0896; H04L 47/06

USPC ...... 370/395.4, 395.41, 395.42, 395.43, 336, 370/337, 345–348, 442–444, 229–235, 370/412–417
See application file for complete search history.

(56) References Cited

U.S. PATENT DOCUMENTS 7,336,665 B1 * 2/2008 Ginjpalli ............. H04L 12/5693
370/230.1

* cited by examiner

*Primary Examiner* — Dady Chery
(74) *Attorney, Agent, or Firm* — Chamberlain Hrdlicka (57) ABSTRACT

A method for managing port bandwidth in network devices. The method includes determining a first and a second ingress bandwidth of a first and a second network chip, respectively, determining an egress bandwidth of an egress port of a third network chip, determining a first and a second weight for the first and the second network chip, respectively, where the first and the second weight are determined based on a bandwidth including the first and second ingress bandwidth, processing a first data packet, received by a first ingress port administrated by the first network chip, based on the first weight and the egress bandwidth, and processing a second data packet, received by a second ingress port administrated by the second network chip, based on the second weight, and the egress bandwidth, where the destination of the first and the second data packet is the egress port.

19 Claims, 6 Drawing Sheets

METHOD AND SYSTEM FOR MANAGING PORT BANDWIDTH IN NETWORK DEVICES

BACKGROUND

Network devices such as switches receive data packets via ingress ports and send data packets via egress ports.

SUMMARY

In general, in one aspect, the invention relates to a method for managing port bandwidth in network devices. The method comprises determining a first ingress bandwidth of a first network chip, determining a second ingress bandwidth of a second network chip, determining an egress bandwidth of an egress port of a third network chip, determining a first weight for the first network chip, wherein the first weight is determined based on the first ingress bandwidth and the second ingress bandwidth, determining a second weight for the second network chip, wherein the second weight is determined based on a bandwidth comprising the first ingress bandwidth and the second ingress bandwidth, processing a first data packet, received by a first ingress port administrated by the first network chip, based on the first weight and the egress bandwidth, wherein the destination of the first data packet is the egress port, and processing a second data packet, received by a second ingress port administrated by the second network chip, based on the second weight, and the egress bandwidth, wherein the destination of the second data packet is the egress port.

In general, in one aspect, the invention relates to a network device that determines a first ingress bandwidth of a first network chip, determines a second ingress bandwidth of a second network chip, determines an egress bandwidth of an egress port of a third network chip, determines a first weight for the first network chip, wherein the first weight is determined based on the first ingress bandwidth and the second ingress bandwidth, determines a second weight for the second network chip, wherein the second weight is determined based on bandwidths comprising the first ingress bandwidth and the second ingress bandwidth, processes a first data packet, received by a first ingress port administrated by the first network chip, based on the first weight and the egress bandwidth, wherein the destination of the first data packet is the egress port, and processes a second data packet, received by a second ingress port administrated by the second network chip, based on the second weight, and the egress bandwidth, wherein the destination of the second data packet is the egress port.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method for network devices to transfer data packets network-device-internally from ingress ports to egress ports. A network device may receive a data packet at an ingress port, identify the appropriate egress port based on the packet's destination, and transfer the packet to the egress port. More specifically, one or more embodiments of the invention include methods to schedule the network-device-internal transfer of data packets when multiple ingress ports receive data packets that are directed to the same egress port. If the combined bandwidth of incoming data packets received by the ingress ports exceeds the bandwidth of the egress port, the egress port may be oversubscribed, i.e. the egress port may not have the capacity to immediately process and send all data packets received from the ingress ports. If oversubscription occurs, the transfer of data packets to an egress port may be delayed for at least some packets directed to the egress port from the ingress ports. Methods according to one or more embodiments of the invention may enable a "fair" distribution of available egress port bandwidth to the ingress ports competing for egress port bandwidth during phases of oversubscription. Shares of an egress port's bandwidth may be allotted to the ingress ports competing for egress port bandwidth using a bandwidth distribution scheme described in the following paragraphs.

The following description describes some embodiments of the invention in which the network devices are switches. However, the invention is not limited to switches; rather embodiments of the invention may be extended to include other network devices (e.g. multi-layer switches).

Figure 1:
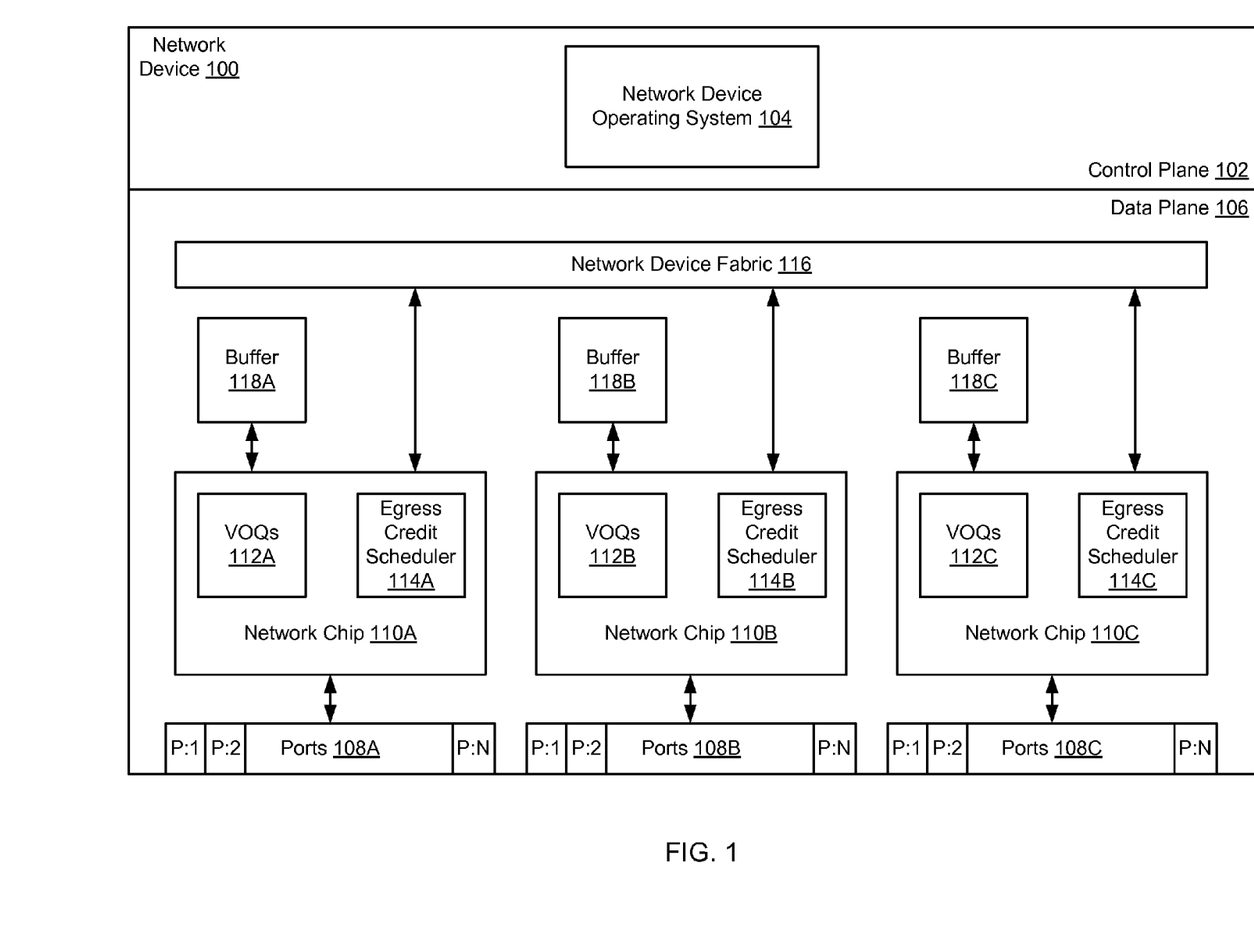
FIG. 1 shows a network device in accordance with one or more embodiments of the invention.

FIG. 1 shows a network devices in accordance with one or more embodiments of the invention. In one embodiment of the invention, the network device (100) may be, for example, a switch or a multilayer switch that includes executable instructions (stored on a non-transitory computer readable medium) and hardware (e.g., a processor, memory, persistent storage, etc.) configured to receive packets from network devices and/or computing devices (not shown), process the packets, and send the packets to other network devices and/or computing devices (not shown). In one or more embodiments of the invention, a data packet may be an Ethernet packet. The Ethernet packet may include data and a media access control (MAC) addresses indicating the source and the destination of the packet. In one embodiment of the invention, the network device (100) may include a control plane (102) and a data plane (106). The control plane may include a network device operating system (OS) (104). The data plane (106) may include groups of physical network ports (108A-108C), network chips (110A-110C), data packet buffers (118A-118C), and a network device fabric (116). The physical network ports (108A-108C), the network chips (110A-110C) and the buffers (118A-118C) may be organized in line cards (120A-120C). The network chips (110A-110C) may implement virtual output queues (VOQs) (112A-112C), and egress credit schedulers (114A-114C). Each of these components is described below.

Figure 2:
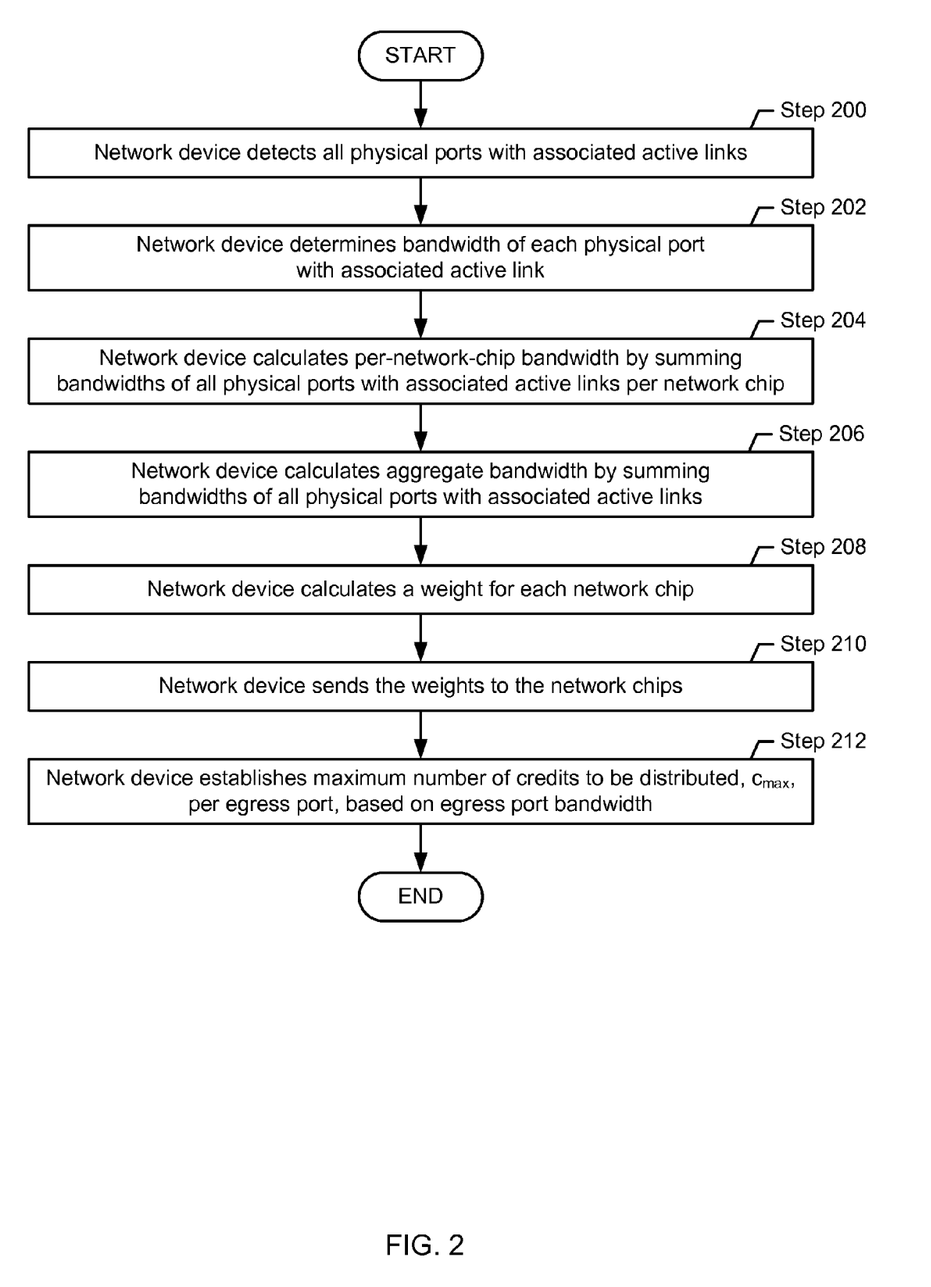
FIG. 2 shows a flowchart in accordance with one or more embodiments of the invention.
Figure 3A:
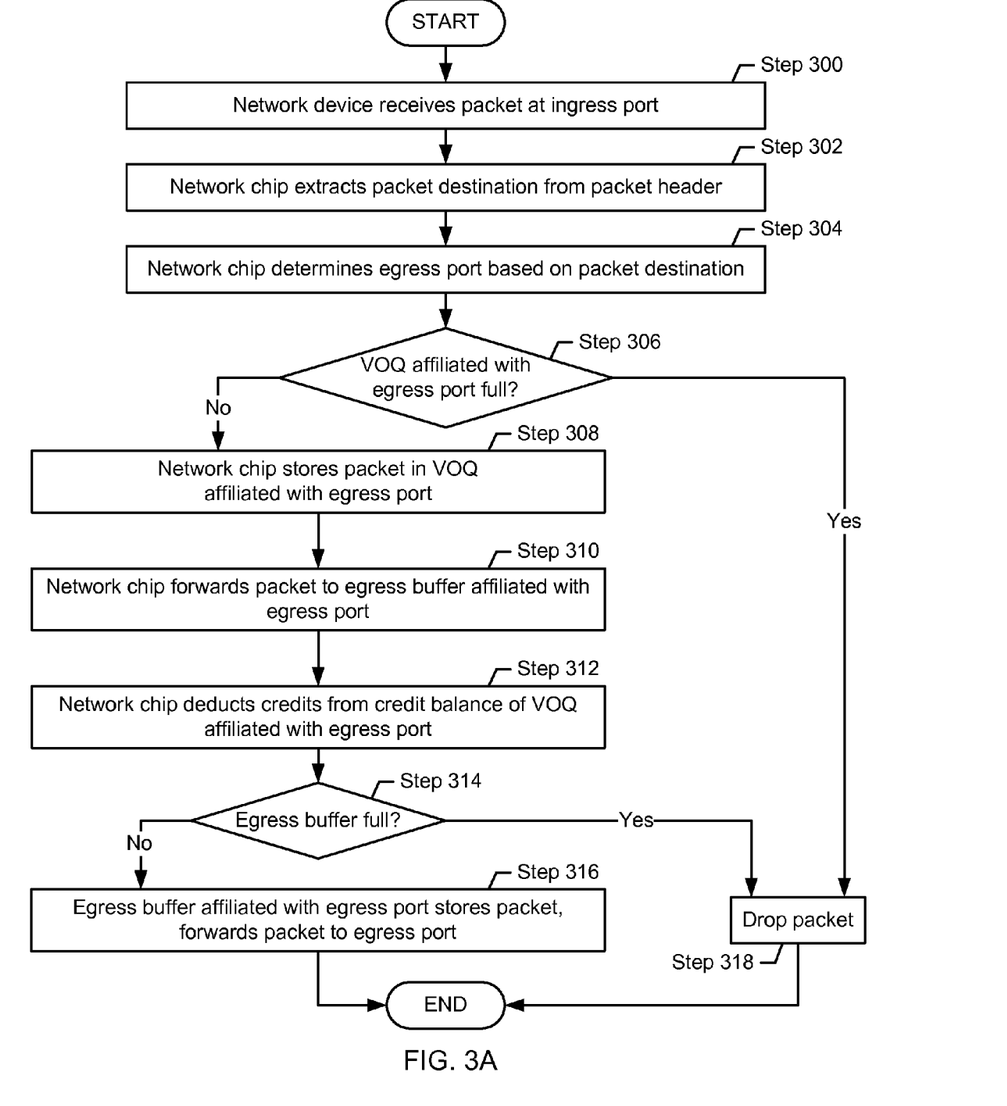
FIGS. 3A-3C show flowcharts in accordance with one or more embodiments of the invention.
Figure 3B:
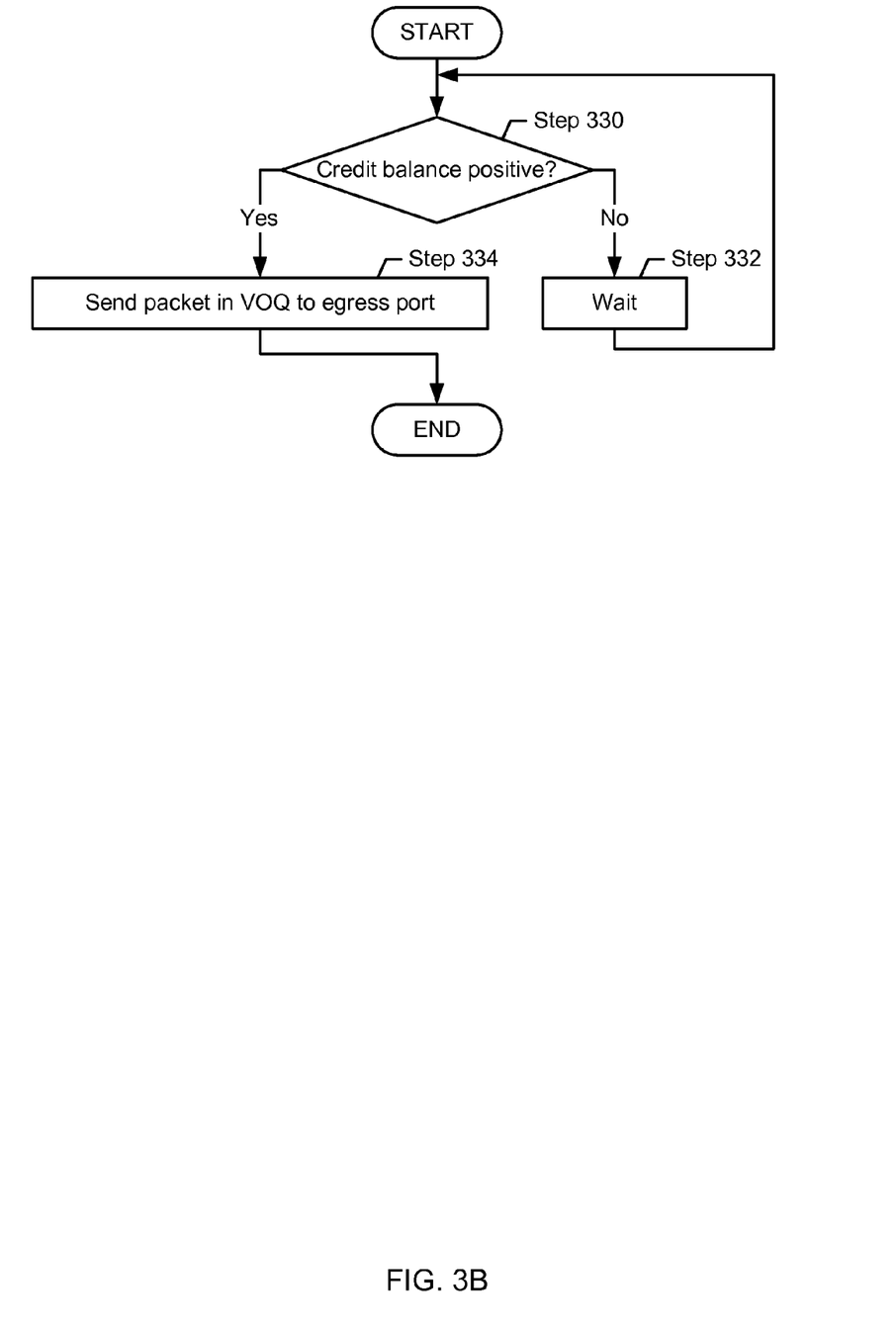
Figure 3C:
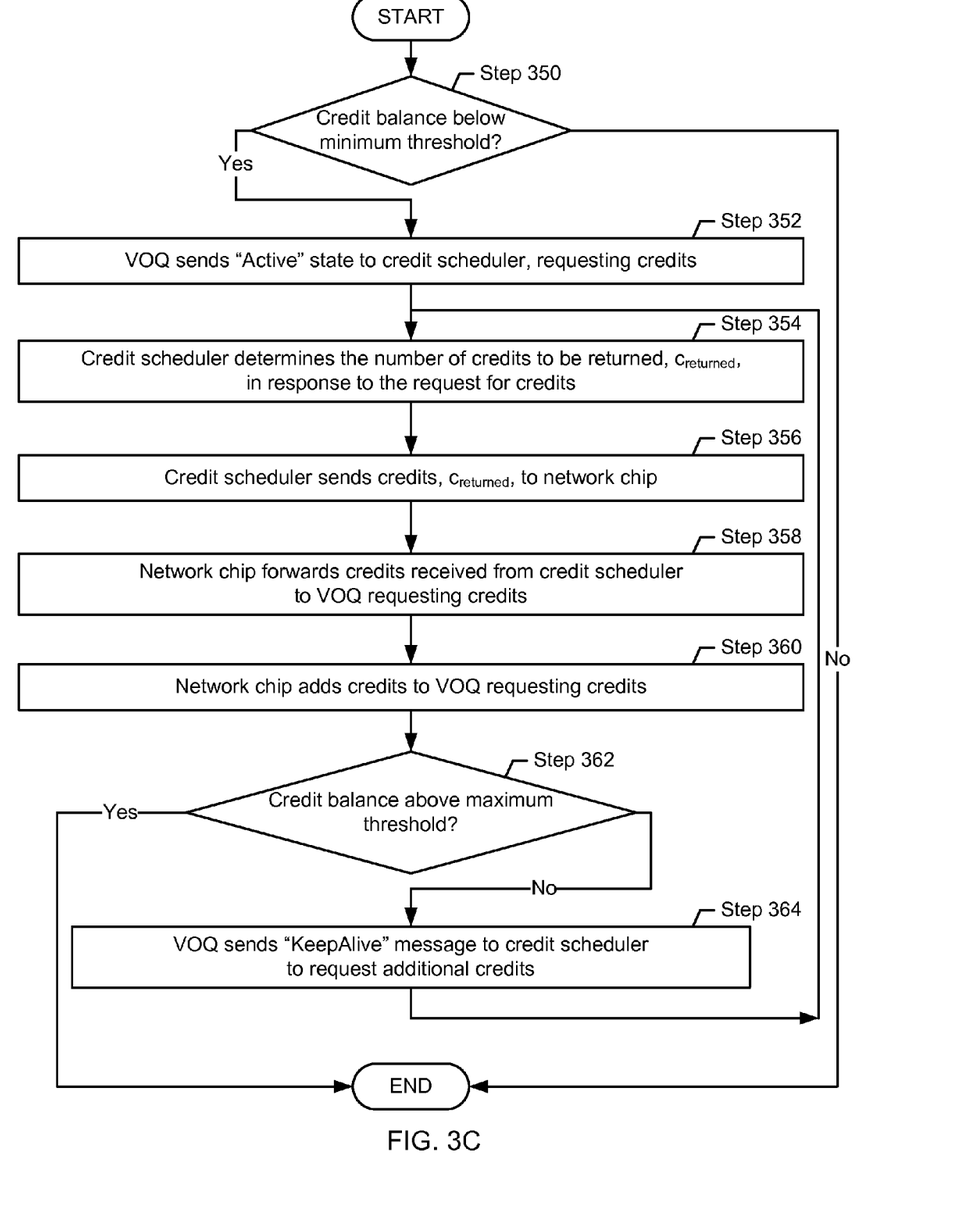

In one or more embodiments of the invention, the network device OS (104) is software that manages the hardware of the network device to provide functionality to the network device (e.g., functionality to implement methods shown in FIGS. 2-3C). The network device OS may be executed on a processor (not shown) that may be located in the control plane (102), along with memory and persistent storage (not shown). In one or more embodiments of the invention, the network device OS may interact with the network chips (110A-110C), for example, as described below.

In one or more embodiments of the invention, physical network ports (P:1-P:N) provide physical interfaces for the network device (100) to connect to other network devices such as routers and switches, and/or to computing devices, such as servers and workstations (not shown). In one or more embodiments of the invention, the ports (P:1-P:N) may be organized in groups of ports (108A-108C). Each group of ports (108A-108C) may interface with one network chip (110A-110C), enabling the network chip to process incoming data packets received by the ports, and further enabling the network chip to forward outgoing packets received from other network chips to the ports. In the embodiment shown in FIG. 1, network chip A (110A) administrates port group A (108A), network chip B (110B) administrates port group B (108B), and network chip C (110C) administrates port group C (108C). In one or more embodiments of the invention, the network chips (110A-110C) may be interconnected by a network device fabric (116). The network device fabric (116) may be a high-bandwidth data connection between the network chips (110A-110C), enabling incoming data packets, received by ingress ports, to be transferred, within the network device (100), via the network chips (110A-110C), to egress ports, from where the data packets may be sent to their destinations. In one or more embodiments of the invention, an egress buffer (not shown) may be affiliated with each of the egress ports. The egress buffers may be used to buffer packets before sending the packets to their destination. In one embodiment of the invention, the network chips (110A-110C) may further be connected to the control plane (102) of the network device (100). The connections to the control plane may enable the network device OS (104) to initialize and parameterize the network chips (110A-110C), and to periodically exchange control commands, parameters and status messages. In one embodiment of the invention, packet buffers (118A-118C), connected to the network chips (110A-110C), may enable the network chips (112A-112C) to temporarily store data packets the network chips may be unable to immediately process. Data packets may be temporarily stored in buffers (118A-118C), for example, when all available bandwidth of an egress port is taken by other data packets being sent.

In one or more embodiments of the invention, network chips (110A-110C) may implement virtual output queues (VOQs) (112A-112C). A VOQ may queue data packets received by an ingress port until the packets may be transferred to the appropriate egress port. In one embodiment of the invention, VOQs may be egress-port-specific, i.e. each VOQ is associated with a specific egress port. Network devices according to one or more embodiments of the invention may be input-buffered, i.e. the VOQ's that buffer data packets directed to an egress port may be located on the ingress side of the network device. If, for example, ports P:1 and P:2 of port group A (108A), port P:2 of port group B (108B), and port P:2 of port group C (108C) are ingress ports directing packets to egress port P:1 of port group C (108C), then network chip A (110A) implements one VOQ for egress port P:1 of port group C (108C), network chip B (110B) implements one VOQ for egress port P:1 of port group C (108C), and network chip C (110C) implements one VOQ egress port P:1 of port group C (108C). All three VOQs are specific to the egress port P:1 of port group C (108C). If the network device is receiving packets for other egress ports, then the network device may establish separate VOQs that are specific to the additional egress port, and that are independent from the VOQs specific to egress port P:1 of port group C (108C). Accordingly, a network chip may implement multiple independent VOQs where each VOQ is specific to a particular egress port.

In one embodiment of the invention, buffers (118A-118C) may temporarily store data packets if a VOQ is full. Once the VOQ has the capacity to accommodate the packets temporarily stored in the buffer, the packets may be transferred from the buffer to the appropriate VOQ. While VOQs (112A-112C) may be implemented within the network chips (110A-110C), buffers (118A-118C) may be external to the network chips (110A-110C).

In one or more embodiments of the invention, the network chips (110A-110C) may implement egress credit schedulers (114A-114C). In one embodiment of the invention, one egress credit scheduler may be established per egress port of the network device. An egress credit scheduler may be implemented by the network chip administrating the egress port. In one or more embodiments of the invention, an egress credit scheduler may use a credit-based system to manage the distribution of the bandwidth of the egress port with which it is affiliated with. A VOQ may transfer data packets from the VOQ to the egress port in exchange for credits. If the credit balance of the VOQ is low, the VOQ may request credits from the egress credit scheduler. The total credit an egress credit scheduler may distribute to VOQs requesting credits may be limited to an amount of credits equivalent to the bandwidth of the affiliated egress port. For example, if the bandwidth of an egress port is 10 gigabits per second (Gbps), the egress credit scheduler may distribute credits up to 10 Gbps.

In one or more embodiments of the invention, the egress credit scheduler affiliated with the egress port controls the transfer of data packets from the network chip(s) administrating the ingress ports to the network chip administrating the egress port, based on the egress port's unused bandwidth, thereby avoiding congestion of the network fabric. A packet that is received by an ingress port initially may be stored in the VOQ affiliated with the egress port. In one embodiment of the invention, credits may be deducted from a credit balance of the VOQ for storing the packet in the VOQ. In one embodiment of the invention, the VOQ credit balance may need to be positive in order to send the packet from the VOQ, via the network device fabric, to the network chip administrating the egress port. If the VOQ's credit balance is too low, the network chip implementing the VOQ may send a request for credits to the egress credit scheduler.

In one embodiment of the invention, the network chip may implement a state machine to balance the VOQ's credit. If the credit balance drops below a preset minimum balance, the state machine may send an "Active" state to the egress credit scheduler, requesting credits. In response, the egress credit scheduler may return an amount of credits. The network chip may receive the amount of credits, and may forward the credits to the VOQ requesting the credits. Further, if the state machine managing the VOQ's credit balance detects a continued need for credits, it may send periodic "KeepAlive" signals to the egress credit scheduler, thus requesting additional credits. The state machine may stop requesting credits by stopping sending periodic "KeepAlive" signals when the credit balance increases above a preset maximum balance. In one embodiment of the invention, the credit-balancing state machine of the VOQ and the egress credit scheduler may be hardware implemented in order to minimize latencies resulting from checking credit, requesting credits, and sending credits.

In one or more embodiments of the invention, multiple ingress ports may simultaneously receive data packets having the same destination. Data packets from multiple ingress ports may therefore be directed to the same egress port. Data packets received by the ingress ports may be stored in VOQs affiliated with the egress port. The network chip(s) may direct requests for credits to the egress credit scheduler in order to obtain a credit balance sufficient to transfer the packets from the VOQs to the network chip administrating the egress port. If the total bandwidth of all packets stored in the VOQs does not exceed the bandwidth of the egress port, all VOQs may receive sufficient credits, enabling the network chip(s) implementing the VOQs to transfer the packets from the VOQs to the network chip administrating the egress port. If, however, the total bandwidth of all packets stored in the VOQs does exceed the bandwidth of the egress port, oversubscription of the egress port may occur, i.e. the bandwidth of the egress port may not be sufficient to process all packets stored in the VOQs. Because the egress credit scheduler may only provide credits corresponding to the bandwidth of the egress port, not all VOQs competing for egress port bandwidth may be able to maintain a positive credit balance, and as a result, not all incoming packets may be immediately transferred from the VOQs to the egress port. Packets may therefore remain in the VOQ(s) until egress port bandwidth becomes available.

In one or more embodiments of the invention, the egress credit scheduler may rely on a set of weights to "fairly" distribute credits, i.e. access to egress port bandwidth, among VOQs competing for egress port bandwidth, when the egress port is oversubscribed. The egress credit scheduler may use weights to determine the number of credits to be returned to a credit-requesting VOQ. In one embodiment of the invention, the network device may assign one weight to each network chip. The weight assigned to a network chip may be based on a bandwidth share of the network chip. For example, a network chip with multiple high-bandwidth ingress ports may be assigned a weight such that a larger number of credits is sent to the network chip, in comparison to another network chip with a single low-bandwidth ingress port directing traffic to the same egress port. In one embodiment of the invention, the weight assigned to a network chip may be a ratio including the per-network-chip bandwidth and the aggregate bandwidth of all network chips of the network device. The network chip bandwidth may be determined, for example, by summing the bandwidths of all physical ports administrated by the network chip that have associated active links. A port may have an associated active link if it is physically connected to another network device or computing device, and if a link is up between the two devices, i.e. both devices have agreed on the communication settings to be used for the link. In one embodiment of the invention, the weight assigned to a network chip may be set based on the sum of data packets received by the ports affiliated with the network chip over a set amount of time. For example, if none of the ports affiliated with a particular network chip receive any packets, the weight assigned to this network chip may be relatively small or zero, whereas if one or more ports affiliated with the network chip receive a high volume of packets, the weight assigned to the network chip may be relatively large. Alternatively, in one or more embodiments of the invention, the weight assigned to a network chip may be set depending on the number of packets stored in the credit-requesting VOQ, and/or based on whether the packets received exceed the capacity of the VOQ and some packets are therefore dropped. For example, if the VOQ is full and incoming packets are dropped, the weight assigned to this network chip may be increased.

In one embodiment of the invention, a bandwidth of 1 Gbps may be added to the per-network-chip bandwidth for ports with bandwidths below 1 Gbps, whereas the actual bandwidth may be added for ports with bandwidths of 1 Gbps or above. In one embodiment of the invention, bandwidth may be discounted if both egress port and ingress port are administrated by the same network chip. If, for example, the ingress port has a bandwidth of 40 Gbps, and the egress port has a bandwidth of 40 Gbps, and both are administrated by the same network chip, the bandwidth counting toward the per-network-chip bandwidth may be 40 Gbps, rather than 80 Gbps. The aggregate bandwidth of all network chips of the network device may be determined by summing the bandwidths of all physical ports that have associated active links, regardless of the network chip administrating the ports. In one embodiment of the invention, the weight assigned to a network chip may be the per-network-chip bandwidth divided by the aggregate bandwidth of all network chips.

In one or more embodiments of the invention, the network device operating system (OS) may periodically check all physical ports of the network device for associated active links and may update the weights accordingly. The weights may be updated, for example, every 30 seconds. Other time periods for updating the weights may be used without departing from the invention. In one embodiment of the invention, the network OS may send the weights to all network chips of the network device, where they may be used by the egress credit schedulers to determine the distribution of credits. In one embodiment of the invention, the credit distribution mechanism may be implemented in hardware on the network chip in order to minimize the delay associated with the distribution of credits. In one embodiments of the invention, if a network chip does not have any port with an associated active link, a default weight value corresponding to one 10 Gbps connection may be assigned to the network chip.

In one or more embodiments of the invention, data packets may be assigned to a set of discrete traffic classes. Traffic classes may be established, for example, to distinguish data packets based on how time critical the delivery of those packets may be, or based on the packets' source and/or destination. In one embodiment of the invention, separate VOQs may be implemented for different traffic classes. If, for example, eight traffic classes are configured, the network chip administrating the ingress port may implement eight concurrent VOQs based on the unique combinations of egress port and traffic classes. The method of trading credits for egress port bandwidth, as described above, may be executed separately for each traffic class of the network device. In one or more embodiments of the invention, the network device may treat a packet differently, depending on the traffic class to which the packet is assigned. Packets assigned to a traffic class with a higher priority may be, for example, processed before packets assigned to a class with a lower priority are processed. For example, if packets from a first ingress port are assigned to class 8 (highest priority), whereas packets from a second ingress port are assigned to class 2 (lower priority), and the packets from the first and the second ingress ports are directed to the same egress port, the class 8 VOQ that handles packets received by the first ingress port may be granted access to egress port bandwidth as needed to transfer all packets to the egress port, whereas the class 2 VOQ that handles packets received by the second ingress port may be granted access to egress port bandwidth only if spare egress port bandwidth remains. If the bandwidth of incoming traffic at the first ingress port reaches or exceeds the bandwidth of the egress port, none of the packets received by the second ingress port may be delivered to the egress port until the first ingress port stops receiving packets. In another embodiment of the invention, a traffic shaper may distribute the bandwidth of an egress port among traffic classes. For example, 50% of the egress port bandwidth may be assigned to traffic class 8 (highest priority), whereas the remaining 50% of egress port bandwidth may be distributed among lower priority traffic classes 1-7. In another embodiment of the invention, traffic classes may have equal priority. Round robin scheduling may be used, for example, to provide egress port access to all traffic classes subsequently.

One skilled in the art will recognize that the architecture of a network device is not limited to the components shown in FIG. 1. For example, the network device may include processors and/or memory not shown in FIG. 1. Further, the number of ports, network chips, egress credit schedulers, virtual output queues (VOQs) and traffic classes may vary depending on the requirements of the network in which the network device is located and/or the activity of other network devices connecting to the network device, without departing from the invention.

FIGS. 2-3C show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-3C may be performed in parallel with any other steps shown in FIGS. 2-3C without departing from the invention.

FIG. 2 shows a method for parameterizing an egress credit scheduler. The steps shown in FIG. 2 may be performed by a network device operating system (OS). The method shown in FIG. 2 may be performed for all network chips of the network device. Further, the method may be executed periodically, for example every 30 seconds, to update the egress credit scheduler parameters in response to a change in network chip bandwidth.

Turning to FIG. 2, in Step 200, the network device detects all physical ports of the network device with associated active links. An active link may be associated with a port if the port is physically connected to another network device or computing device, and if a link is up between the two devices.

In Step 202, the network device determines the bandwidths of the physical ports with associated active links, detected in Step 200. For a physical port with a bandwidth below 1 Gbps, a bandwidth of 1 Gbps may be assigned. For a physical port with a bandwidth of 1 Gbps or higher, the actual bandwidth may be assigned. In Step 204, the network device calculates the per-network-chip bandwidth by summing the bandwidths of all physical ports with associated active links, determined in Steps 200 and 202, separately for each network chip. In Step 206, the network device calculates the aggregate bandwidth by summing the bandwidths of all physical ports with associated active links, determined in Steps 200 and 202. In Step 208, the network device calculates a weight for each network chip. In one embodiment of the invention, the weight assigned to a network chip may be the per-network-chip bandwidth (determined in Step 204) divided by the aggregate bandwidth of all network chips (determined in Step 206). In Step 210, the network device sends the weights to the network chips. In Step 212, the network device determines the bandwidth of the egress port. The bandwidth of the egress port determines the maximum number of credits, $c_{max}$, the egress credit scheduler may distribute to network chips requesting credits.

For example, the network device may determine that a network chip A has a first physical port with a bandwidth of 100 Gbps, a second physical port with a bandwidth of 200 Gbps, and a third physical with a bandwidth of 100 Gbps, and that all three ports have associated active links (Steps 200 and 202). Further, the network device may determine that a network chip B has a first physical port with a bandwidth of 100 Gbps, and a second physical port with a bandwidth of 10 Gbps, and that both ports have associated active links (Steps 200 and 202). The network device determines that the per-network-chip bandwidth for network chip A is 100 Gbps+200 Gbps+100 Gbps=400 Gbps (Step 204). Further, the network device determines that the per-network-chip bandwidth for network chip B is 100 Gbps+10 Gbps=110 Gbps (Step 204). The network device calculates the aggregate bandwidth of network chip A and network chip B combined: 400 Gbps+110 Gbps=510 Gbps (Step 206). Accordingly, the weight value for network chip A is 400 Gbps/510 Gbps=0.78, and the weight value for network chip B is 110 Gbps/510 Gbps=0.22 (Step 208).

FIGS. 3A-3C show a method for transferring a data packet received by an ingress port to an egress port. The packet is processed, depending on the availability of sufficient egress port bandwidth. Steps of the method described in FIGS. 3A-3C may be continuously and concurrently executed for multiple ingress ports.

FIG. 3A shows a method for processing a data packet received by an ingress port of the network device. The data packet is stored in a virtual output queue (VOQ) associated with the appropriate egress port, according to the method described in FIG. 3A. A separate instance of the method shown in FIG. 3A may be executed for each ingress port directing packages to an egress port.

Turning to FIG. 3A, in Step 300, the network device receives a data packet at an ingress port. In Step 302, the network chip administrating the ingress port examines the data packet for destination information. According to the Ethernet standard, a media access control (MAC) address may identify a packet's destination. In Step 304, the network chip administrating the ingress port determines the appropriate egress port, based on the destination of the data packet. In Step 306, a determination is made about whether the VOQ affiliated with the egress port is full. If the VOQ is not full, the method may proceed to Step 308. In Step 308, the network chip stores the data packet in the VOQ. In Step 310, the network chip forwards the data packet to the egress buffer affiliated with the egress port. In Step 312, the network chip implementing the VOQ deducts credits from the credit balance of the VOQ. In Step 314, a determination is made about whether the egress buffer affiliated with the egress port is full. If the egress buffer is not full, the method may proceed to Step 316. In Step 316, the egress buffer affiliated with the egress port stores the data packet in the egress buffer, and eventually forwards the data packet to the egress port which subsequently transmits the data packet. Returning to Step 314, if a determination is made that the egress buffer affiliated with the egress port is full, the method may proceed to Step 318. In Step 318, the data packet is dropped. Returning to Step 306, if a determination is made that the VOQ affiliated with the egress port is full, the method may proceed to Step 318. In Step 318, the data packet is dropped.

FIG. 3B shows a method for transferring a data packet from the VOQ, where the packet is stored, to the egress port. A separate instance of the method shown in FIG. 3B may be executed for each VOQ directing packages to an egress port.

Turning to FIG. 3B, in Step 330, a determination is made about whether the credit balance of the VOQ storing the data packet is positive. If the credit balance is not positive, the method may proceed to Step 332.

In Step 332, the process waits, and the data packet remains in the VOQ. Returning to Step 330, if a determination is made that the credit balance is positive, the method may proceed to Step 334. In Step 334, the data packet is removed from the VOQ and sent to the network chip administrating the egress port. The network chip administrating the egress port forwards the data packet to the egress port, from where it is sent to the destination.

FIG. 3C shows a method for managing the credit balance of the virtual output queue (VOQ). Credits are deducted from the credit balance of the VOQ when a data packet enters the VOQ or the buffer in Step 310 of FIG. 3A. The credit balance of the VOQ is monitored by the network chip implementing the VOQ. If necessary, the network chip implementing the VOQ requests credits from the egress credit scheduler associated with the egress port. In response, the egress credit scheduler may return credits. A separate instance of the method shown in FIG. 3C may be executed for each VOQ requesting credits from an egress credit scheduler. Further, the method described in FIG. 3C may be executed concurrently with the methods described in FIGS. 3A and 3B.

In Step 350, a determination is made about whether the credit balance of the VOQ affiliated with the egress port is below a minimum threshold. If the credit balance is below the minimum threshold, the method may proceed to Step 352.

In Step 352, the network chip implementing the VOQ sends an "Active" state message to the egress credit scheduler affiliated with the egress port to request credits.

In Step 354, the egress credit scheduler determines the number of credits to be returned in response to the request for credits. The amount of credits returned determines the share of egress port bandwidth assigned to the network chip administrating the ingress port, thus determining the number of data packets the network chip may transfer from the VOQ to the egress port. The amount of credits returned, $c_{returned}$, may depend on the total credit available for the egress port, $c_{max}$, and a network-chip-specific weight that may scale the amount of credits returned, based on the bandwidth share of the network chip. $c_{max}$ may be determined according to the method described in FIG. 2, Step 212, and the weight may be determined according to the method described in FIG. 2, Step 208.

In Step 356, the egress credit scheduler sends the credits, $c_{returned}$ to the network chip requesting credits. In Step 358, the network chip, having received the credits from the egress credit scheduler, transfers the credits to the VOQ requesting the credits. In Step 360, the network chip adds the received credits to the VOQ's credit balance.

In Step 362, a determination is made about whether the credit balance of the VOQ is above a maximum threshold. If the credit balance is not above the maximum threshold, the method may proceed to Step 364. In Step 364, the network chip implementing the VOQ sends a "KeepAlive" message to the egress credit scheduler to renew the request for credits.

Figure 4:
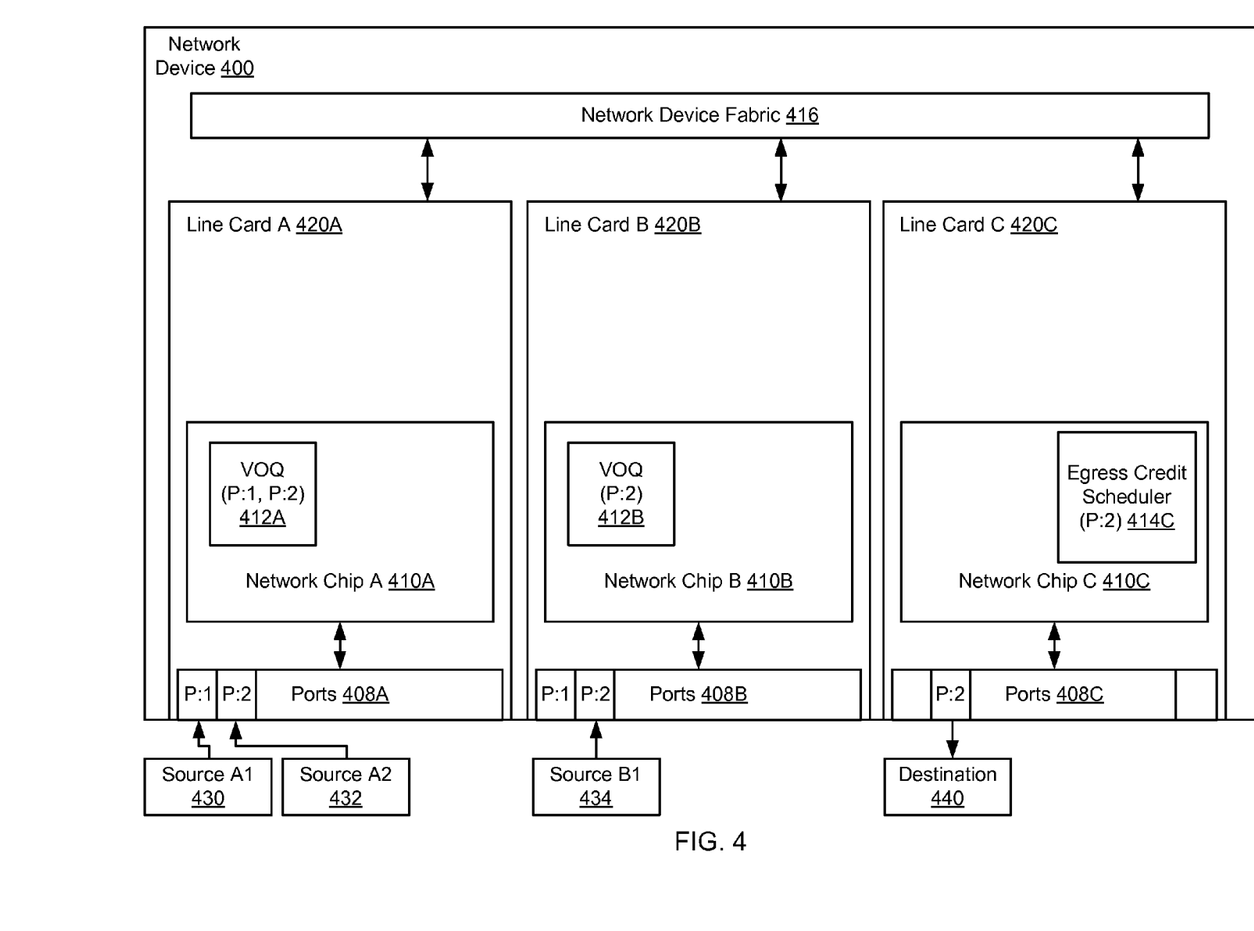
FIG. 4 shows a network that includes network devices in accordance with one or more embodiments of the invention.

FIG. 4 shows a scenario where a network device (400) is receiving packets from three sources (430-434). The packets from all three sources (430-434) have the same destination (440). Sources A1 (430) and A2 (432) are connected to physical ports P:1 and P:2, respectively, of port group A (408A), of line card A (420A). Ports P:1 and P:2 of port group A (408A) are ingress ports. Both ports have a bandwidth of 40 Gbps. The network chip (410A) of line card A (420A) implements a virtual output queue (VOQ) (412A) for the two ingress ports of the line card. Source B1 (434) is connected to physical port P:2 of port group B (408B), of line card B (420B). Port P:2 of port group B (408B) is an ingress port. The port has a bandwidth of 10 Gbps. The network chip (410B) of line card B (420B) implements one VOQ (412B) for the ingress port of the line card. The destination device (440) is connected to physical port P:2 of port group C (408C), of line card C (420C). Port P:2 of port group C (408C) is an egress port. The port has a bandwidth of 40 Gbps. The network chip (410C) of line card C (420C) implements the egress credit scheduler (414C) affiliated with the egress port. The network device fabric (416) provides a high-bandwidth data connection between the network chips (410A-410C).

The use case scenario described below is intended to provide an example of the method for transferring data in network devices from ingress ports to egress ports, described in FIGS. 2-3C. The use case scenario is based on the sample network shown in FIG. 4 and is for illustrative purposes only. The method described by FIGS. 2-3C is not limited to the network topology shown in FIG. 4, but rather is universally applicable to a wide range of networks of different topology, complexity and size.

Example Use Case 1

Consider a scenario in which the network device, implementing the method shown in FIG. 2, detects four physical ports with associated active links. The bandwidths of the ports with the associated active links are 40 Gbps (ingress port, P:1 of line card A), 40 Gbps (ingress port, P:2 of line card A), 10 Gbps (ingress port, P:2 of line card B) and 40 Gbps (egress port, P:2 of line card C). The per-network-chip bandwidths are 40 Gbps+40 Gbps=80 Gbps for network chip A, 10 Gbps for network chip B, and 40 Gbps for network chip C. The aggregate bandwidth of all network chips is 40 Gbps+40 Gbps+10 Gbps+40 Gbps=130 Gbps. Accordingly, the weight assigned to network chip A is 80 Gbps/130 Gbps=0.615; the weight assigned to network chip B is 10 Gbps/130 Gbps=0.077; and the weight assigned to network chip C is 40 Gbps/130 Gbps=0.308. The amount of credits the egress credit scheduler may distribute is limited to the bandwidth of the egress port, i.e. $c_{max}=40$.

In this use case scenario assume that all three ingress ports direct packets to the egress port. Accordingly, the network chips execute the method described in FIG. 3A, separately for each ingress port. The packets received by the ingress ports are transferred into the corresponding virtual output queues (VOQs), and a credit is deducted from each VOQ's credit balance, according to the number of packets stored in the VOQ.

Further, the network chips execute the method described in FIG. 3B, separately for each ingress port. Initially, the balances of all VOQs are negative, as a result of storing packets in the VOQs according to the method described in FIG. 3A. None of the VOQs are therefore allowed to transfer packets to the egress port.

The method described in FIG. 3C is executed concurrently with the methods described in FIGS. 3A and 3B. Accordingly, the network chips implementing the VOQs detect that all VOQ credit balances have dropped below a minimum threshold. The network chips implementing the VOQs therefore send "Active" state messages to the network chip implementing the egress credit scheduler. Accordingly, the egress credit scheduler on network chip C receives requests for credits from network chips A and B. In response, the egress credit scheduler returns a number of credits to each network chip according to the weight assigned to each network chip. Given the weights assigned to the network chips (network chip A: 0.615, network chip B: 0.077 and network chip C: 0.308), network chip A would receive a 0.615/(0.615+0.077+0.308)=61% share of credits, corresponding to an egress port bandwidth share of 24.6 Gbps. Network chip B would receive a 0.077/(0.615+0.077+0.308) =8% share of credits, corresponding to an egress port bandwidth share of 3.1 Gbps.

Because network chip C does not have a VOQ requesting credits, the credits corresponding to the weight assigned to network chip C (weight of network chip C: 0.308) may be distributed to the VOQs of network chips A and B as well. Due to continued oversubscription, the VOQs implemented by network chips A and B keep requesting credits from the egress credit scheduler. The egress credit scheduler responds by distributing the remaining available credit according to the weights assigned to network chips A, B and C. The process of the VOQs requesting credits, and the egress credit scheduler distributing credit repeats continuously until the VOQs stop requesting credits. Accordingly, the credit distribution converges to a distribution of 100% of the available credit between the VOQs of network chips A and B, whereas network chip C does not receive credits, despite the weight assigned to network chip C, because network chip C does not implement a VOQ requesting credits. Accordingly, the credit distribution converges to a distribution ratio where 0.615/(0.615+0.077)=89% of the available egress port bandwidth are assigned to the VOQ of network chip A and where 0.077/(0.615+0.077)=11% of the egress port bandwidth are assigned to the VOQ of network chip B. Given the egress port bandwidth of 40 Gbps, these credits correspond to approximately 35.6 Gbps bandwidth assigned to network chip A, and approximately 4.4 Gbps bandwidth assigned to network chip B. Accordingly, ports P:1 and P:2 of network chip A receive an aggregate egress port bandwidth share of 36.6 Gbps, which may be split evenly between these ports. The VOQ on network chip B receives credits worth 4.4 Gbps. Accordingly, P:2 for network chip B receives an egress port bandwidth share of 4.4 Gbps. Due to the oversubscription, all three ingress ports therefore experience the same slowdown of approximately 56%, with ports P:1 and P:2 of network chip A having a 40 Gbps bandwidth and receiving 18.3 Gbps egress port bandwidth shares, and with port P:2 of network chip B having a 10 Gbps bandwidth and receiving a 4.4 Gbps egress port bandwidth share.

Returning to the method described in FIG. 3C, packets from the two VOQs are transferred, via the network chip fabric, to the egress port, from where the packets are sent to the destination. However, because the egress port is oversubscribed, not all packets in the VOQ may be transferred to the egress port. According to the method described in FIG. 3C, all three VOQs therefore send "KeepAlive" messages to the egress credit scheduler to request additional credits.

Example Use Case 2

In another use case scenario, where, in addition to the ports described in the previous use case scenario, network chip C has an oversubscribed 40 Gbps ingress port directing traffic to the egress port, the weights assigned to the network chips are identical to the weights described in the previous use case scenario. As previously described, the additional port on network chip C is discounted because ingress port and egress port are administrated by the same network chip. Accordingly the bandwidth of network chip C considered for weight calculation is 40 Gbps. The resulting weights assigned to the network chips therefore remain unchanged (network chip A: 0.615, network chip B: 0.077 and network chip C: 0.308). However, the distribution of credits deviates from the previously described distribution because VOQs implemented by network chips A, B and C request credits, rather than the VOQs of network chips A and B only. Accordingly, the VOQ implemented by network chip A receives a 0.615*40 Gbps=24.6 Gbps share of egress port bandwidth. The VOQ implemented by network chip B receives a 0.077*40 Gbps=3.1 Gbps share of egress port bandwidth, and the VOQ implemented by network chip C receives a 0.308*40 Gbps=12.3 Gbps share of egress port bandwidth. Accordingly, all four ingress ports are experiencing the same slowdown during oversubscription.

If the situation of oversubscription persists over a prolonged period, the VOQs may fill with packets. Additional packets may be stored in the packet buffers connected to the network chips. Packets may only be dropped if the situation of oversubscription is not resolved, and when both the VOQ and the buffer have filled with packets.

Example Use Case 3

Referring to FIG. 4, in a different use case scenario, only source A1, connected to port P:1 of line card A is sending packets. The use case scenario is based on the port configuration as initially described, i.e. ports P:1 and P:2 of line card A, port P:2 of line card B and port P:2 of line card C have active links. Accordingly, the weights of the previous use cases apply. The network device executes the methods described by FIGS. 2-3C, as previously described. However, only the VOQ affiliated with port P:1 of line card A receives packets, and therefore requests credits. Because there are no other VOQs requesting credits, the egress credit scheduler, in response to the initial "Active" state message and subsequent "KeepAlive" messages directs all credits to network chip A. Accordingly, the full 40 Gbps bandwidth of the egress port is dedicated to the VOQ for ingress port P:1, and no oversubscription occurs.

Example User Case 4

Referring to FIG. 4, in another use case scenario, source A1, connected to port P:1 of line card A, and source B1, connected to port P:2 of line card B, are sending packets. Source A2, connected to port P:2 of line card A does not send packets; however, the link to port P:2 of line care A remains active. The use case scenario is based on the port configuration as initially described, i.e. ports P:1 and P:2 of line card A, port P:2 of line card B and port P:2 of line card C have active links. Accordingly, the weights of the previously presented use cases apply. The network device executes the methods described by FIGS. 2-3C, as previously described. The VOQ affiliated with port P:1 of line card A receives packets, and the VOQ affiliated with port P:2 of line card B receives packets, and therefore both VOQs request credits. The egress credit scheduler directs credits to the VOQs, based on the weights assigned to the network chips. Accordingly, as previously described, network chip A, having a weight of 0.615, receives a 0.615/(0.615+0.077)=89% share of credits and network chip B, having a weight of 0.077, receives a 0.077/(0.615+0.077)=11% share of credits. Port P:1 of network chip A therefore receives an egress port bandwidth share of 36.6 Gbps, and port P:2 of network chip B receives an egress port bandwidth share of 4.4 Gbps.

Embodiments of the invention may enable a network device to "fairly" handle situations of oversubscription, where multiple ingress ports direct traffic to the same egress ports, and where the bandwidth of the ingress traffic exceeds the bandwidth of the egress port. Equal assignment of egress port bandwidth to network chips administrating ingress ports is "fair" only when all network chips administrating ingress ports handle the same bandwidth. In contrast, the method according to one or more embodiments of the invention may assign egress port bandwidth to network chips administrating ingress ports based on actual network chip bandwidth. Accordingly, the method according to one or more embodiments of the invention may "fairly" distribute egress port bandwidth among ingress ports competing for bandwidth, regardless of the bandwidths handled by the network chips. Thus, the network device ensures that all ingress ports experience a similar, i.e. "fair" bandwidth constraint during periods of oversubscription. Accordingly, no ingress port may experience a disproportionate slowdown. Further, because all ingress ports may be equally affected by potential bandwidth constraints, no single ingress port may be required to rely on the network-chip-external buffer more than other ingress ports. Accordingly the likeliness of the buffer filling and dropping packets may be reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing port bandwidth in network devices, the method comprising:
    determining a first weight for a first network chip;
    determining a second weight for a second network chip;
    processing a first data packet, received by a first ingress port administrated by the first network chip, based on the first weight and an egress bandwidth of an egress port of a third network chip, wherein the destination of the first data packet is the egress port; and
    wherein the processing of the first data packet comprises:
        storing the first data packet in a virtual output queue (VOQ) of the first network chip;
        deducting first credits for the first data packet from a credit balance of the VOQ,
            wherein the credit balance is based on the first weight and the egress bandwidth;
        sending the first data packet to the egress port, when, after deducting the first credits from the credit balance associated with the VOQ, the credit balance remains non-negative; and
    processing a second data packet, received by a second ingress port administrated by the second network chip, based on the second weight, and the egress bandwidth, wherein the destination of the second data packet is the egress port.

2. The method of claim 1, wherein the VOQ is one of a plurality of VOQs of the first network chip, wherein each of the plurality of VOQs is associated with a distinct egress port, wherein at least one of the distinct egress ports is located on at least one selected from the second network chip and the third network chip.

3. The method of claim 1, wherein the VOQ is one of a plurality of VOQs of the first network chip, wherein there are multiple traffic classes, wherein each of the plurality of VOQs is associated with a unique combination of egress port and traffic class.

4. The method of claim 1, wherein the first weight and the second weight are updated.

5. The method of claim 1, wherein the first weight and the second weight are sent to each of the first network chip, the second network chip, and the third network chip.

6. The method of claim 1,
    wherein the first weight is determined based on a first ingress bandwidth determined for the first network chip and a second ingress bandwidth determined for the second network chip, and
    wherein the second weight is determined based on a bandwidth comprising the first ingress bandwidth and the second ingress bandwidth.

7. The method of claim 6, wherein determining the first ingress bandwidth comprises summing bandwidths of all ingress ports of the first network chip that have associated active links.

8. The method of claim 6, wherein determining the first weight comprises determining a ratio of the first ingress bandwidth and a sum comprising the first ingress bandwidth and the second ingress bandwidth.

9. The method of claim 8, wherein the sum of the first ingress bandwidth and the second ingress bandwidth is greater than the egress bandwidth.

10. The method of claim 6, wherein the first ingress bandwidth is not equal to the second ingress bandwidth.

11. A network device comprising:
    a first network chip comprising a first ingress port;
    a second network chip comprising a second ingress port;
    a third network chip comprising an egress port; and
    wherein the network device is configured to:
        determine a first weight for the first network chip;
        determine a second weight for the second network chip;
    wherein the first network chip is configured to process a first data packet, received by the first ingress port, based on the first weight and the egress bandwidth of the egress port, wherein the destination of the first data packet is the egress port; and
    wherein the processing of the first data packet comprises:
        storing the first data packet in a virtual output queue (VOQ) of the first network chip;

deducting first credits for the first data packet from a credit balance of the VOQ wherein the credit balance is based on the first weight and the egress bandwidth;

sending the first data packet to the egress port, when, after deducting the first credits from a credit balance associated with the VOQ, the credit balance remains non-negative; and wherein the second network chip is configured to process a second data packet, received by the second ingress port, based on the second weight, and the egress bandwidth, wherein the destination of the second data packet is the egress port.

12. The network device of claim 11, wherein the network device is further configured to:

determine a first ingress bandwidth of the first network chip by summing bandwidths of all ingress ports of the first network chip that have associated active links; and determine a second ingress bandwidth of the second network chip by summing bandwidths of all ingress ports of the second network chip that have associated active links.

13. The network device of claim 12, wherein the network device is further configured to:

determine the first weight by determining a ratio of the first ingress bandwidth and a sum comprising the first ingress bandwidth and the second ingress bandwidth.

14. The network device of claim 11, wherein the VOQ is one of a plurality of VOQs of the first network chip, wherein each of the plurality of VOQs is associated with a distinct egress port, wherein at least one of the distinct egress ports is located on at least one selected from a second network chip and the third network chip.

15. The network device of claim 11, wherein:

the first network chip requests a first credit from an egress credit scheduler associated with the egress port of the third network chip for a virtual output queue (VOQ), wherein a credit balance of the VOQ is below a threshold;

the egress credit scheduler associated with the egress port determines an amount of credits to be returned to first network chip, wherein the amount of credits is based on the first weight and the egress bandwidth;

the egress credit scheduler sends the amount of credits to the first network chip; and the first network chip adds the amount of credits to the credit balance.

16. The network device of claim 11 further comprising:

a first line card comprising the first network chip;

a second line card comprising the second network chip; and a third line card comprising the third network chip.

17. The network device of claim 11, wherein the network device is a multilayer switch.

18. A method for managing port bandwidth in network devices, the method comprising:

processing a first data packet, received by a first ingress port administrated by a first network chip, based on a first weight assigned to the first network chip and an egress bandwidth, wherein the destination of the first data packet is an egress port of a third network chip; and processing a second data packet, received by a second ingress port administrated by the second network chip, based on the second weight, and the egress bandwidth, wherein the destination of the second data packet is the egress port;

requesting, by the first network chip, a first credit for the first data packet from an egress credit scheduler associated with the egress port for a virtual output queue (VOQ), wherein a credit balance of the VOQ is below a first threshold;

determining an amount of credits to be returned to the first network chip by the egress credit scheduler associated with the egress port, wherein the amount of credits is based on the first weight and the egress bandwidth;

sending, by the egress credit scheduler, the amount of credits to the first network chip; and adding, by the first network chip, the amount of credits to the credit balance of the VOQ.

19. The method of claim 18, wherein the first network chip does not request credits from the egress credit scheduler when the credit balance is above a second threshold.

* * * * *